April 9, 1957     F. H. ZIMMERLI     2,788,441

MEASURING AND CONTROLLING APPARATUS

Filed Dec. 16, 1950     3 Sheets-Sheet 1

*INVENTOR.*
FRED H. ZIMMERLI
BY Arthur H. Swanson
ATTORNEY.

*INVENTOR.*
FRED H. ZIMMERLI

April 9, 1957     F. H. ZIMMERLI     2,788,441
MEASURING AND CONTROLLING APPARATUS
Filed Dec. 16, 1950     3 Sheets-Sheet 3

*INVENTOR.*
FRED H. ZIMMERLI
BY
ATTORNEY.

United States Patent Office 2,788,441
Patented Apr. 9, 1957

2,788,441

MEASURING AND CONTROLLING APPARATUS

Fred H. Zimmerli, Fort Washington, Pa., assignor to Minneapolis-Honeywell Regulator Company, Minneapolis, Minn., a corporation of Delaware Application December 16, 1950, Serial No. 201,088

6 Claims. (Cl. 250—27)

The general object of the present invention is to provide measuring and controlling apparatus for electrically effecting proportional control and including novel means for effecting a temporary initial magnification of the response of the controlling apparatus to a change in the controlled variable. More specifically, an object of the invention is to provide novel means for effecting a temporary regulatory adjustment, in response to a change in the value of a controlled variable, which is in excess of that required to return the controlling apparatus to a balanced condition, the purpose of such an initial corrective effect being to increase the rapidity of the return of the controlled variable to the desired or control point value without creating an objectionable tendency of the apparatus to over-travel or hunt.

A primary and practically important object of the invention is to provide a rate action circuit network including an input circuit on which an alternating voltage primary control signal may be impressed, and including means operative in response to the control signal to develop in one portion of the network a temporary alternating auxiliary control signal for augmenting the control effect of the primary control signal, and to develop in another portion of the network an alternating voltage feedback signal which is opposite in phase to the primary control signal and which is fed back to said input circuit and attenuates said auxiliary control signal.

A further and more specific object of the invention is to include in said network thermal means for delaying the development of said feedback signal.

The present invention is well adapted for use with apparatus for effecting electrical proportional control with automatic reset of the character disclosed and claimed in the application of Robert J. Ehret, Serial No. 160,158, filed May 5, 1950, now Patent No. 2,694,169. However, the present invention is also adapted for use with proportional control apparatus not providing automatic reset, and for use with other forms of apparatus than that disclosed in the said Ehret patent.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 2:
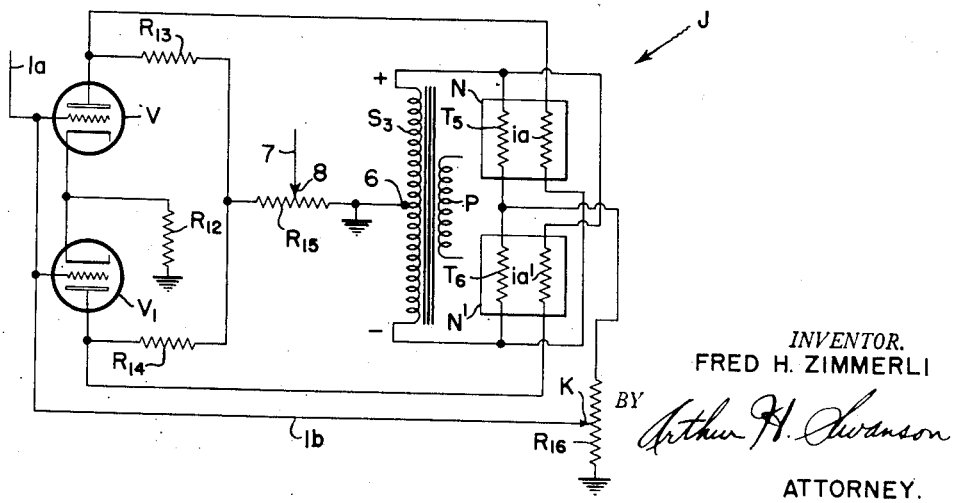
Fig. 2 is a diagram illustrating in more detail the rate response circuit included in the apparatus shown in Fig. 1.
Figure 4:
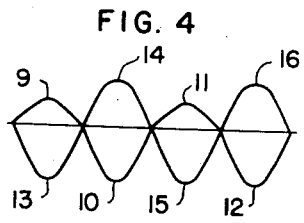
Figure 5:
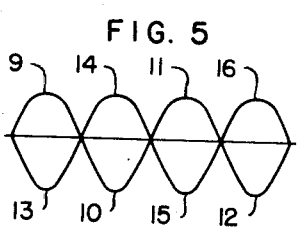
Figure 6:
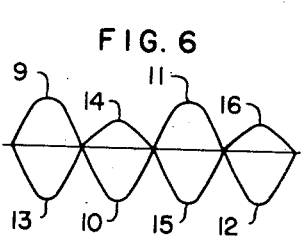
Figure 7:
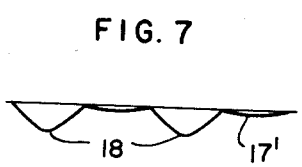
Figure 8:
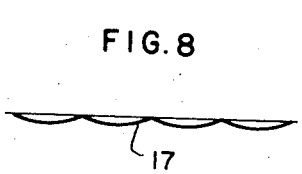
Figure 9:
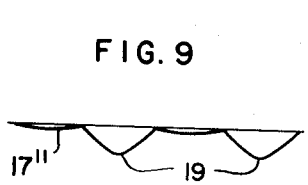

Figs. 4, 5, and 6 are diagrams illustrating voltage conditions in the rate response circuit shown in Fig. 2; and Figs. 7, 8, and 9 are diagrams representing resultant voltages respectively derived from the diagrams shown in Figs. 4, 5, and 6.

Figure 1:
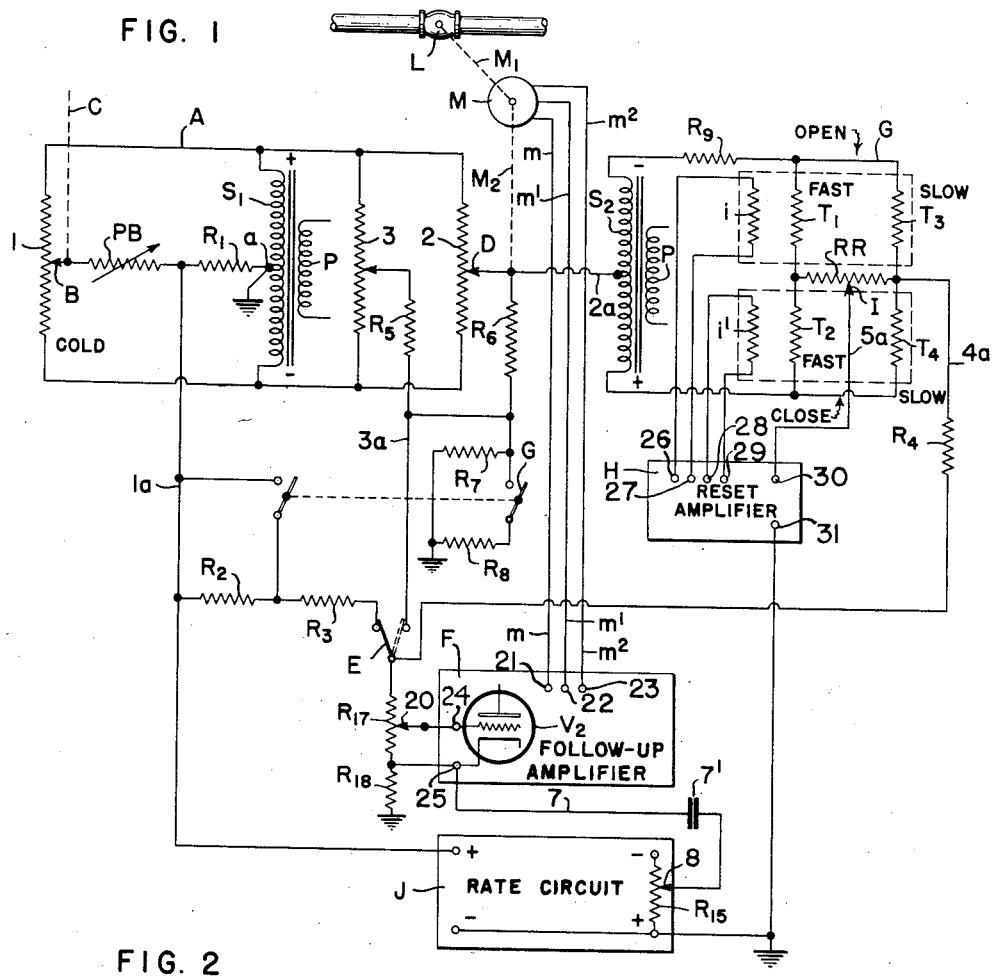
Fig. 1 is a diagram illustrating the present invention.

The arrangement shown diagrammatically in Fig. 1 includes apparatus for effecting proportional control with automatic reset, and comprises a follow-up bridge circuit A, a reset bridge circuit G, a follow-up amplifier F, and a reset amplifier H, all of the character disclosed in the above mentioned Ehret patent, in combination with my novel apparatus for effecting a rate action. The follow-up bridge A includes a measuring slide wire resistor 1, a regulator or follow-up slide wire resistor 2, a manual control slide wire resistor 3, and a winding $S_1$ which, in practice, is the secondary winding of an alternating current transformer having a primary winding P adapted to be connected to a suitable source of alternating current, not shown. The winding $S_1$ has a center-tap $a$ which is connected to ground. The winding $S_1$ impresses an alternating voltage across each of the slide wire resistors 1, 2, and 3. Measuring apparatus, not shown, operates through an adjusting element C to adjust a slider contact B along the slide wire 1 in automatic response to changes in the value of a controlled variable. When the latter is a furnace temperature, as may well be the case, the measuring apparatus may take various forms. For example, such apparatus may be a self-balancing potentiometric measuring instrument, or it may be apparatus responsive to variations in the bulb pressure of a fluid pressure thermometer.

As diagrammatically shown, a motor M operates through an adjusting element $M_1$ to adjust a regulator L, shown as a fuel valve, and simultaneously operates through an adjusting element $M_2$ to adjust a slider contact D along the slide wire 2 in response to variations in the position along the slide wire 1 of the slider contact B, i. e., in response to variations in the value of the controlled variable. The motor M is directly controlled and actuated by the follow-up amplifier F, and is electrically connected to the output terminals 21, 22, and 23 thereof by respective conductors $m$, $m'$, and $m^2$. The regulator adjusted by the motor M may take various forms other than the one shown herein by way of example.

The amplifier F operates in response to variations in the resultant of control voltages impressed on the amplifier input circuit. One of these voltages is the voltage developed across a resistor $R_1$. The latter is connected in series with a variable proportional band resistor PB between the slider contact B and the mid-point of the winding $S_1$. As explained above, the mid-point of the winding $S_1$ is connected to ground, and the potential of the slider contact B is therefore at ground potential when the contact B is in engagement with the mid-point of slide wire 1. This position of the contact B corresponds to the desired, control point value of the controlled variable, and is therefore referred to as the control point position of the contact B.

When the contact B is displaced from the mid-point of the slide wire 1, and hence from the control point position, a voltage is developed across the resistor $R_1$ of one phase or of the opposite phase, accordingly as the displacement of the contact B is in one direction or the opposite direction from the control point position. A conductor $1a$, connected to the junction of the resistors $R_1$ and PB, forms one output terminal of the bridge A, while a second output terminal of the bridge A comprises a conductor $2a$ which connects the contact D to the mid-point of an energizing winding $S_2$ for the reset bridge G. The grounded conductor connected to the winding mid-point $a$ serves as a third output terminal for the bridge A.

The windings $S_1$ and $S_2$ may well be separate secondary windings of the same transformer, and the voltage induced in the winding $S_1$ may be substantially lower than the voltage induced in the winding $S_2$. For example, the voltage induced in the winding $S_1$ may be 12.6 volts while the voltage induced in the winding $S_2$ may be 40 volts. The relative polarities of the voltages of the windings $S_1$ and $S_2$ are shown in Fig. 1 to aid in explaining the operation of the disclosed apparatus.

The reset bridge G includes a first pair of resistors $T_1$ and $T_2$ connected in series with one another, and a second pair of resistors $T_3$ and $T_4$ connected in series with one another. Each of the resistors $T_1$, $T_2$, $T_3$, and $T_4$ may be a matched replica of each of the others, and is a temperature responsive element having an appreciable temperature coefficient of resistance, which may well be a negative temperature coefficient of resistance. The second ends of the resistors $T_1$ and $T_3$ are connected to one terminal of the winding $S_2$ through a current limiting resistor $R_9$, and the second terminals of the resistors $T_2$ and $T_4$ are directly connected to the second terminal of the winding $S_2$. The connected ends of the resistors $T_1$ and $T_2$ are connected to the connected ends of the resistors $T_3$ and $T_4$ by a slide wire resistor RR which serves a reset rate control function. The connected ends of the resistors $T_3$ and $T_4$ and the reset rate resistor RR are connected to the output conductor or terminal $4a$ of the reset bridge G. The slide wire resistor RR is engaged by slider contact I. The latter is connected to a second output conductor or terminal $5a$ of the reset bridge G.

The output terminal $4a$ is connected through a resistor $R_4$ to a switch blade member E. When the latter is in the "automatic" position, shown in full lines in Fig. 1, it engages a fixed contact member connected through resistors $R_2$ and $R_3$ to the conductor $1a$. The output terminal $5a$ of the reset bridge G is connected to one of the input terminals 30 of the reset amplifier H, the other input terminal 31 of which is connected to ground. The switch member E is connected to the upper terminal of a slide wire resistor $R_{17}$, the lower terminal of which is connected through a resistor $R_{18}$ to ground and hence to the output terminal of the bridge A formed by the grounded center-tap $a$. Engaging the resistor $R_{17}$ is a slider contact 20 which is connected to the control grid input terminal 24 of the amplifier F. The cathode input terminal 25 of the amplifier F is connected to the junction between the resistors $R_{17}$ and $R_{18}$, whereby the position of the slider contact 20 along the resistor $R_{17}$ determines the sensitivity of the amplifier F by controlling the proportion of the control signal applied thereto. That control signal is, of course, the composite signal applied from the bridges A and G across the resistors $R_{17}$ and $R_{18}$ between the switch member E and ground.

The reset bridge G also includes a heating resistor $i$ for heating the resistors $T_1$ and $T_3$ and a second heating resistor $i'$ for heating the resistors $T_2$ and $T_4$. The heating resistors $i$ and $i'$ are selectively energized by the reset amplifier H through amplifier output terminals 26, 27, 28, and 29 in accordance with the signal being transmitted thereto through the output conductor $5a$.

In the apparatus of Fig. 1, the heater $i$ is arranged to heat the "fast" resistor $T_1$ more quickly than it heats the "slow" resistor $T_3$. If the heating action is sufficiently prolonged, the resistor $T_3$ ultimately attains the same temperature as the resistor $T_1$. Because of these differences in their respective rates of heating, the resistors $T_1$ and $T_3$ are commonly referred to as "fast" and "slow" resistors, respectively, as shown by the labeling in Fig. 1. The heating actions of the heating resistor $i'$ on the resistors $T_2$ and $T_4$ are similarly so related that the resistor $T_2$ is a "fast" resistor and the resistor $T_4$ is a "slow" resistor.

A change in the value of the controlled variable, following a period in which the bridges A and G are both balanced, results in a movement of the contact B from the control point position and the consequential development of a primary control signal across the resistor $R_1$ which is transmitted through the output conductor $1a$ and the resistors $R_2$ and $R_3$ to the input of the amplifier F and causes the latter to energize the motor M for operation in the direction required to give a corrective adjustment to the regulator adjusted through the connection $M_1$. Thus, for example, if the controlled variable is a furnace temperature and the regulator is the furnace fuel supply valve L, and if a decrease in the furnace temperature produces a downward movement of the contact B toward the "cold" end of the slide wire 1, the motor M will then operate to adjust the fuel valve L through its connection $M_1$ to increase the fuel supply to the furnace, and will operate through the connection $M_2$ to give an upward adjustment to the contact D. That adjustment will be of such a magnitude that the alternating voltage follow-up signal then transmitted to the input of the amplifier F through the output terminal $2a$ of the follow-up bridge A and through the reset bridge G and the conductor $4a$ will be equal in magnitude, but opposite in phase, to the signal then being transmitted to the amplifier F through the output terminal $1a$ of the bridge A, and hence will have the effect of arresting the motion of the motor M.

While the initial signal impressed on the reset bridge G by the output terminal $2a$ of the bridge A is not modified by the reset bridge, that signal is transmitted to the input terminal 30 of the reset amplifier H through the output terminal $5a$ of the reset bridge. The effect of that signal on the reset amplifier is the selective resistor heating action required to develop an alternating voltage reset signal in the reset bridge G which is impressed on the output conductor $4a$.

That reset voltage signal may be regarded as a third signal impressed on the input circuit of the follow-up amplifier F, and is opposite in phase to the follow-up signal transmitted through the reset bridge circuit from the contact D to the output conductor $4a$. In consequence, it is proper to assume that the output conductor $4a$ does not transmit two opposing signals to the input of the amplifier F, but only the resultant of those two signals. In the absence of a change in furnace load or an analogous change, the third or reset signal progressively increases until the controlled variable returns to its normal or control point value, unless it should happen that the control system including the regulator L has insufficient capacity to effect such return. Such action occurs because the reset signal is in phase with the original primary control signal and hence causes additional motion of the motor M and valve L in the direction to bring the controlled temperature back to the control point value.

Normally, the reset action is maintained until the contact B has been returned to, or approximately to, the control point position. When this occurs, the reset signal will be equal in magnitude to the signal of opposite phase transmitted to the reset bridge by the follow-up bridge terminal $2a$.

Which of the pairs of resistors $T_1$—$T_3$ and $T_2$—$T_4$ is heated by the reset amplifier in order to provide a reset signal in the output of the reset bridge G depends upon whether the change in the controlled variable is a decrease or an increase, respectively. That is, a decrease in the value of the controlled variable will cause the reset amplifier H to heat the resistors $T_1$ and $T_3$, by means of the resistor $i$, at a faster rate than the resistors $T_2$ and $T_4$ are heated so as to produce a reset signal capable of further opening the valve L in an effort to increase the value of the controlled variable. Consequently, resistors $T_1$ and $T_3$ are heated to open the valve L, and hence are labeled "open" in Fig. 1.

In like manner, resistors $T_2$ and $T_4$ serve to effect closing of the valve L when heated by the resistor $i'$, and hence have been labeled "close" in Fig. 1.

The manual slide wire resistor 3, a resistor $R_5$, a conductor $3a$, and a second fixed contact member cooperating with the switch member E are included in the Fig. 1 apparatus for the purpose of providing manual control when desired. Since such manual control is the same as that provided by the apparatus of the aforementioned Ehret patent, and forms no part of the present invention, no further description of it appears necessary herein.

The resistor $R_2$, resistors $R_3$, $R_7$, and $R_8$, and a switch G cooperate in the Fig. 1 apparatus to provide two ranges of proportional band, just as corresponding elements cooperate in the apparatus of the aforementioned Ehret patent to perform this function. Accordingly, since this feature does not constitute a portion of the present invention, no further description of it is required herein.

Figure 1A:
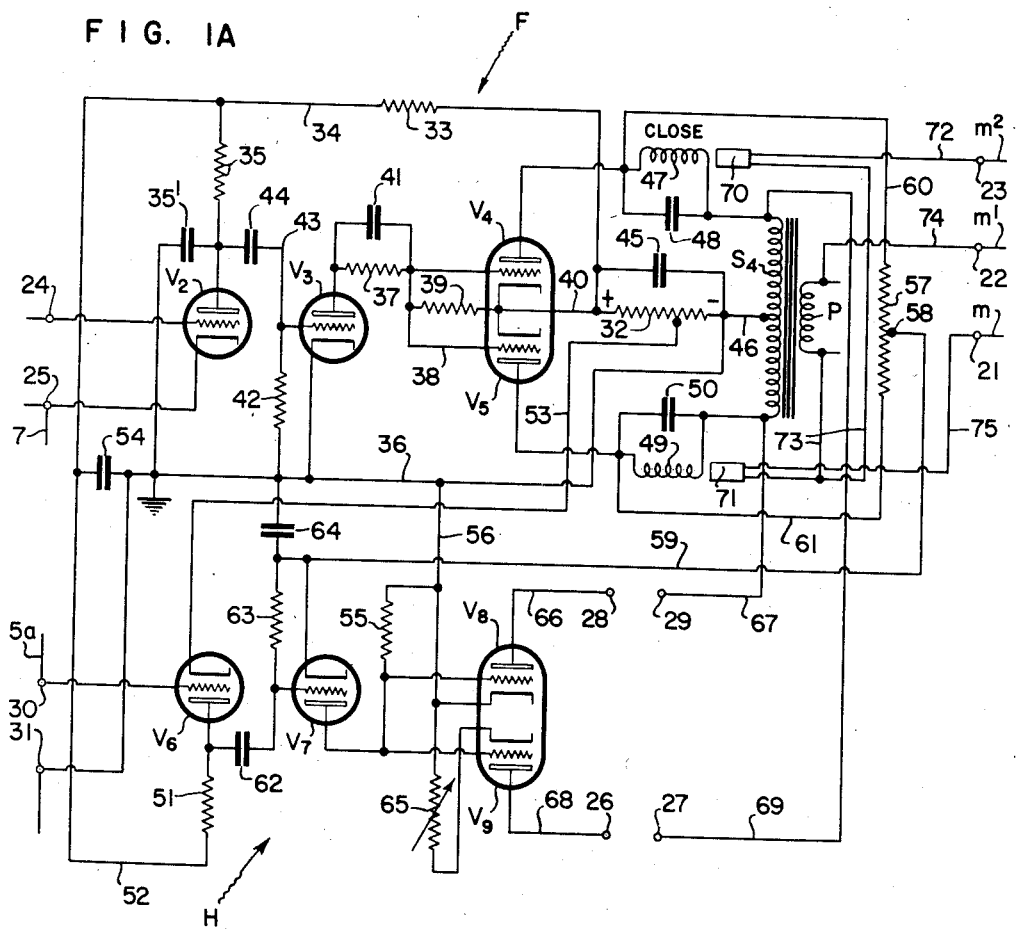
Fig. 1A is a diagram illustrating the details of a desirable form for the amplifiers F and H of the apparatus shown in Fig. 1.

There are shown in Fig. 1A the circuit details of a desirable form which the follow-up amplifier F and reset amplifier H of Fig. 1 may take. The amplifier form and circuitry shown in Fig. 1A are essentially those employed in the controller of the aforementioned Ehret patent, the arrangement of Fig. 1A being identical to the amplifier circuitry shown in Fig. 1 of said Ehret patent except for a necessary modification made to the input circuit of the follow-up amplifier F to permit the application to this input circuit of the temporary or rate signal produced by the rate circuit J as shown in Fig. 1 herein. As is done in said Ehret patent, the circuits for the follow-up amplifier F and reset amplifier H, shown diagrammatically in separate rectangles in Fig. 1, are shown in Fig. 1A as being energized from a common source of energizing voltage and hence interconnected therewith. Thus, the upper portion of the Fig. 1A arrangement is the circuit of the follow-up amplifier F, having at the left the two input terminals 24 and 25 shown in the rectangle for the amplifier F in Fig. 1, and having at the right the three output terminals 21, 22, and 23, as shown in Fig. 1, respectively connected to the motor energizing conductors $m$, $m^1$, and $m^2$. The lower portion of the Fig. 1A arrangement is the circuit of the reset amplifier H, having at the left the two input terminals 30 and 31, and having at the right the four output terminals 26, 27, 28, and 29, all as shown in Fig. 1.

The follow-up amplifier F comprises four electronic triodes $V_2$, $V_3$, $V_4$, and $V_5$, all of which are energized from a common energizing transformer secondary winding $S_4$, which may well be an additional secondary winding on the aforementioned transformer having the primary winding P. The triodes $V_4$ and $V_5$ are shown as being the halves of a twin triode, which may well be of the commercially available 12AU7 type, while each of the triodes $V_2$ and $V_3$, although shown separately, may be the triodes of a twin triode of the commercially available 12AX7 type. As shown, the triodes $V_2$ and $V_3$ form a two stage voltage amplifier for amplifying the resultant of the signals applied to the follow-up amplifier input terminals 24 and 25.

In Fig. 1A, as in Fig. 1, the control grid of the triode $V_2$ is shown as being connected to the follow-up amplifier input terminal 24, while the cathode of the triode $V_2$ is shown as being connected to the input terminal 25. The energizing voltage impressed on the output circuit of each of the triodes $V_2$ and $V_3$ is the voltage drop in a resistor 32 which is included in a common portion of the output circuit of the triodes $V_4$ and $V_5$. The positive, left-hand end of the resistor 32 is connected through a resistor 33, a conductor 34, and a second resistor 35 to the anode of the triode $V_2$. The cathode of the latter is connected through the aforementioned resistor $R_{13}$ to ground and thus to the grounded, negative, right-hand end of the resistor 32 by means of a common ground conductor 36. The anode of the triode $V_2$ is connected to the conductor 36 through a condenser 35'.

The anode of the triode $V_3$ is connected to the positive end of the resistor 32 through a connection including in series a resistor 37, a conductor 38, a resistor 39, and a conductor 40. A condenser 41 is connected in parallel with the resistor 37. The cathode of the triode $V_3$ is connected to the negative end of the resistor 32 through the grounding conductor 36.

The input circuit of the triode $V_2$ may be traced from the control grid thereof to the terminal 24, to the contact 20, through the portion of the resistor $R_{17}$ below the contact 20, and back to the cathode of the triode $V_2$ by way of the terminal 25. The input circuit of the triode $V_3$ consists essentially of a resistor 42 through which the control grid of the triode $V_3$ is connected to the grounding conductor 36 and thence to the grounded cathode of the triode $V_3$. The control grid of the triode $V_3$ is also connected to the anode of the triode $V_2$ through a conductor 43 and a condenser 44.

The cathodes of the triodes $V_4$ and $V_5$ are connected to the previously mentioned conductor 40 and thence to the positive end of the resistor 32, while the control grids of the triodes $V_4$ and $V_5$ are connected to the previously mentioned conductor 38. Thus, the output of the triode $V_3$ is coupled to the inputs of the triodes $V_4$ and $V_5$. The output circuit of the triode $V_4$ includes the cathode of that triode; the conductor 40; the resistor 32; a condenser 45 connected in parallel with the resistor 32; a conductor 46, connecting the grounded negative end of the resistor 32 to a mid-point connection on the winding $S_4$; the upper half of the winding $S_4$; a relay winding 47, through which the upper end of the winding $S_4$ is connected to the anode of the triode $V_4$; and a condenser 48 connected in parallel with the winding 47. The output circuit of the triode $V_5$ includes the cathode of that triode, the conductor 40, the resistor 32 with its parallel connected condenser 45, the conductor 46, the lower half of the winding $S_4$, a relay winding 49 which connects the lower end of the winding $S_4$ to the anode of the triode $V_5$, and a condenser 50 connected in parallel with the winding 49.

The reset amplifier H comprises four electronic triodes $V_6$, $V_7$, $V_8$, and $V_9$, and is much like the follow-up amplifier F. Thus, as shown, the triodes $V_8$ and $V_9$ are the halves of a twin triode, which may well be of the commercially available 12AU7 type. Similarly, the triodes $V_6$ and $V_7$ may be the halves of a twin triode of the commercially available 12AX7 type, although these triodes have been shown separately in Fig. 1A.

The anode circuit of the reset amplifier triode $V_6$ is energized by the voltage developed across the resistor 32, and its output circuit may be traced from the anode of the valve $V_6$ through a resistor 51, a conductor 52, the conductor 34, the resistor 33, a portion of the resistor 32, and a conductor 53 connecting a tap on the resistor 32 to the cathode of the triode $V_6$. A condenser 54 is connected between the conductors 52 and 36.

The input circuit of the triode $V_6$ can be traced from the cathode of the triode through conductor 53, said portion of the resistor 32, grounding conductor 36, input terminal 31, and the external circuits shown in Fig. 1 back to the control grid of the triode $V_6$ by way of the conductor $5a$ and the input terminal 30.

The output circuit of the triode $V_7$ comprises the anode of the triode, a resistor 55, a conductor 56, the grounding conductor 36, the conductor 46, separate connections between the conductor 46 and the two end terminals of a resistor 57 which is connected in a manner to be described, a center-tap connection 58 on the resistor 57, and a conductor 59 connecting the center-tap 58 to the cathode of the triode $V_7$. The connection between the conductor 46 and the upper end terminal of the resistor 57 includes the upper half of the secondary winding $S_4$, the relay coil 47, the condenser 48 in parallel therewith, and a conductor 60. The connection between the conductor 46 and the lower end terminal of the resistor 57 includes the lower half of the winding $S_4$, the relay winding 49, the condenser 50 in parallel therewith, and a conductor 61. The control grid of the triode $V_7$ is connected to the anode of the triode $V_6$ by a condenser 62, and is connected to the cathode of the triode $V_7$ and to the conductor 59 by a resistor 63. A condenser 64 connects the conductor 59 to the grounding conductor 36.

The control grids of the triodes $V_8$ and $V_9$ are directly connected to the anode of the triode $V_7$, and are connected through the resistor 55 and the conductor 56 to the grounding conductor 36. The cathode of the triode $V_8$ is connected to the grounding conductor 36, and thence to the control grid of the triode $V_8$ through the resistor 55. The cathode of the triode $V_9$ is connected to the grounding conductor 36 through a variable resistor 65, and is thus connected to the control grid of the triode $V_9$ through the resistors 65 and 55. The resistor 65 serves to limit the maximum reset obtainable with the apparatus.

The anode of the triode $V_8$ is connected by a conductor 66 to the reset amplifier output terminal 28, from where it is connected to one end terminal of the previously mentioned heater $i'$. The second end terminal of the heater $i'$ is connected by way of the output terminal 29 and a conductor 67 to the lower end terminal of the secondary winding $S_4$, and is connected through the lower half of the winding $S_4$ and the series-connected conductors 46, 36, and 56 to the cathode of the triode $V_8$. The anode of the triode $V_9$ is connected by a conductor 68 to the output terminal 26, and thence to one end terminal of the heater $i$. The second terminal of the latter is connected by means of output terminal 27 and a conductor 69 to the upper end terminal of the secondary winding $S_4$, and thence through the upper half of the winding $S_4$ and the series connected conductors 46, 36, and 56 and the variable resistor 65 to the cathode of the triode $V_9$.

The relays 47 and 49 in the output of the follow-up amplifier F control the energization and operation of the motor M in accordance with the resultant signal applied to the follow-up amplifier input terminals 24 and 25. Specifically, a switch mechanism 70 is actuated by the energization of the relay coil 47 to complete one energizing circuit for the motor M, while a switch mechanism 71 is actuated by the energization of the relay coil 49 to complete another energizing circuit for the motor M. The first mentioned motor energizing circuit can be traced from the motor energizing conductor $m^2$ through the follow-up amplifier output terminal 23, a conductor 72, the switch mechanism 70, and a conductor 73 to the alternating current supply conductor connected to the lower end terminal of the transformer primary winding P. This motor energizing circuit is completed by a conductor 74 which is connected between the remaining alternating current supply conductor, connected to the upper end terminal of the primary winding P, and the motor conductor $m'$ through the output terminal 22.

The second of the aforementioned motor energizing circuits can be traced from the motor conductor $m$ through the output terminal 21, a conductor 75, the switch mechanism 71, and the conductor 73 to one of the alternating current supply conductors. This energizing circuit is completed by means of the conductor 74 connecting the other alternating current supply conductor to the output terminal 22 and the conductor $m'$.

By virtue of the circuitry just described, the follow-up amplifier F and the reset amplifier H of the Fig. 1 controller are operative, respectively, to control the energization of the motor M and the operation of the reset bridge heaters $i$ and $i'$ in the manner set forth herein and described in more detail in said Ehret patent.

Fig. 2 discloses an electronic circuit arrangement J for establishing a temporary alternating rate action control signal in response to a change in an input signal. This temporary alternating voltage rate signal is applied to the input of the follow-up amplifier F of Fig. 1. The phase of the rate signal from the electronic circuit J as applied to the amplifier F is the same as that of the primary signal voltage applied to the amplifier F from the instrument slide wire contact B. In consequence, the follow-up amplifier F operates the follow-up motor M, and thereby the slider contact D and valve L, to an extent greater than that which would be required to rebalance the bridge A for the new position of the instrument slide wire contact B in the absence of the device J. This additional valve adjustment is a so-called initial magnification or rate response or rate action adjustment, and serves the purpose of increasing the condition correction so as to return more quickly the controlled condition to the desired control point value.

The electronic rate response circuit J shown in Fig. 2 includes two electronic triodes V and $V_1$. These triodes have their control grids directly connected together, and also have their cathodes directly connected together. The cathodes are also connected to ground through a bias resistor $R_{12}$.

Each of the triodes V and $V_1$ has its output circuit energized with alternating voltage derived from a transformer including a center-tapped secondary winding $S_3$ having its center-tap 6 connected directly to ground. The secondary winding $S_3$ may well be a winding of the transformer including the aforementioned secondary windings $S_1$, $S_2$, $S_4$ and the primary winding P. Specifically, the anode of the triode V is connected through a heater resistor $ia$ to the lower end terminal of the transformer secondary winding $S_3$, while the other end terminal of the latter is connected through a heater resistor $ia'$ to the anode of the triode $V_1$.

The anodes of the triodes V and $V_1$ are also connected to the grounded center-tap 6 of the secondary winding $S_3$. Thus, the anode of the triode V is connected through a resistor $R_{13}$ to one end terminal of a slide wire resistor $R_{15}$, and the anode of the triode $V_1$ is connected through a resistor $R_{14}$ to the same end terminal of the resistor $R_{15}$. The other end terminal of the resistor $R_{15}$ is connected to the grounded center-tap 6 of the secondary winding $S_3$. As is hereinafter explained, more or less of the net alternating voltage signal developed across the resistor $R_{15}$ is impressed on the input circuit of the follow-up amplifier F through a conductor 7 and a condenser $7'$. One end of the conductor 7 is connected to the resistor $R_{15}$ at a variable distance from its grounded end through a slider contact 8.

From the above it can be seen that there are two parallel paths of current flow associated with each of the triodes V and $V_1$. Specifically, associated with the triode V is a first current path which can be traced from the lower terminal of the transformer secondary winding $S_3$ through the heater resistor $ia$ to the anode of the triode V, through that triode to its cathode, and through the bias resistor $R_{12}$ to the grounded center-tap 6 of the winding $S_3$. The second current path associated with the triode V can be traced from the lower terminal of the winding $S_3$ and through the resistors $ia$, $R_{13}$, and $R_{15}$ to the grounded center-tap 6.

Similarly, the first path associated with the triode $V_1$ can be traced from the upper terminal of the winding $S_3$ and through the heater resistor $ia'$, the triode $V_1$, and the resistor $R_{12}$ to the grounded center-tap 6, while the second path for this triode can be traced from the upper terminal of the winding $S_3$ and through the resistors $ia'$, $R_{14}$, and $R_{15}$ to the grounded center-tap 6.

In consequence of the connections just described, alternating currents flow in opposite directions through the slide wire resistor $R_{15}$ from the winding $S_3$ during each half cycle of the alternating voltage supplied to the transformer primary winding P. Were the triodes V and $V_1$ not present in the circuit, these opposing currents would always be of equal magnitude, and would always produce a resultant voltage drop of zero across the resistor $R_{15}$. Similarly, with the triodes connected in the circuit as shown and maintained non-conductive, zero voltage would be produced across the resistor $R_{15}$.

In the operation of the present invention, however, the triodes V and $V_1$ are normally maintained slightly equally conductive as long as the slider contact B is at the control point position. Consequently, there is normally a small pulsating voltage developed across the resistor $R_{15}$. This voltage does not significantly affect the operation of the amplifier F, however, since it contains no components of supply voltage frequency, but only a double-frequency component, as will be explained hereinafter. Accordingly, zero effective voltage is developed across the resistor $R_{15}$ for the control point position of the contact B.

Upon a displacement of the contact B from the control point, corresponding to a change in the value of the controlled variable from the desired value, an input signal of appropriate phase and magnitude will be applied to the input of the apparatus J by the conductor $1a$ and the ground connection to the resistor $R_{12}$. Since each of the triodes V and $V_1$ is capable of conducting current only during the corresponding alternate half cycles of the alternating supply voltage in which its anode is rendered positive with respect to the associated cathode, the above mentioned input signal will cause an unbalance in the conductivities of the triodes V and $V_1$. Which of the triodes V and $V_1$ will have its conductivity increased, and which will have its conductivity decreased, depends upon the direction of movement of the contact B, and hence upon the direction of change of the controlled variable.

Unequal conductivities of the triodes V and $V_1$ produce a corresponding inequality in the currents flowing through the resistor $R_{15}$, since a change in triode conductivity changes the parallel impedance connected across the corresponding current path including the resistor $R_{15}$, and hence changes the current flow therethrough due to the presence of said path. Therefore, the appearance of an input signal applied to the circuit J causes a resultant voltage drop to appear across the resistor $R_{15}$ which has an effective component of supply voltage frequency having a phase and magnitude respectively dependent upon the phase and magnitude of the input signal to the circuit J. This component is applied to the amplifier F exclusive of the direct current component of the voltage drop, due to the presence of the condenser $7'$ in the conductor 7.

Summarizing the above, when the instrument slide wire contact B is moved from the position corresponding to the desired control point, an alternating voltage signal corresponding in phase to the direction of movement of the contact is applied to the inputs of the triodes V and $V_1$. One of the triodes V and $V_1$ is then made more conductive than the other, and the triode which is made more conductive provides a current path of increased conductivity in parallel with the resistor $R_{15}$. In consequence, there is produced a resultant current flow in one direction through the resistor $R_{15}$. There is thus developed across the resistor $R_{15}$ an alternating voltage component having the same frequency as the frequency of the alternating supply voltage, and having a phase corresponding to the direction of movement of the instrument slide wire contact B from the control point position.

As shown, the alternating current component of the output signal developed across at least a portion of the resistor $R_{15}$ is applied through the condenser $7'$ to the input of the amplifier F, between the cathode input terminal thereof and ground. Specifically, the cathode input terminal 25 of the amplifier F is connected by the conductor 7 and condenser $7'$ to the contact 8 of the resistor $R_{15}$, while one end of the latter is connected to ground and hence to the lower end of the resistor $R_{13}$ and to the grounded center-tap $a$ of the winding $S_1$. As will be more fully explained hereinafter, the rate signal applied to the input of the amplifier F from the resistor $R_{15}$ is always of such a phase as to augment the primary control signal applied to that amplifier from the bridge A.

The circuit J shown in Fig. 2 includes a bridge circuit having two arms formed by the transformer secondary winding $S_3$, and having temperature sensitive resistors $T_5$ and $T_6$ in its other two arms. Each of the resistors $T_5$ and $T_6$ may well have an appreciable negative temperature coefficient of resistance. The junction of the resistors $T_5$ and $T_6$ is connected through a slide wire resistor $R_{16}$ to ground and thereby to the center-tap 6 of the transformer secondary winding $S_3$. The resistors $T_5$ and $T_6$ are connected in series across the winding $S_3$, with the resistor $T_5$ connected to the end of the winding $S_3$ to which is connected the heater resistor $ia'$ and thence the anode of the triode $V_1$. The resistor $T_6$ is connected to the end of the winding $S_3$ to which the heater resistor $ia$ connects the anode of the triode V.

A movable contact K which is associated with the slide wire resistor $R_{16}$ is directly connected to the grids of the triodes V and $V_1$ by a conductor $1b$. The resistor $R_{16}$ and its connection to the grids of the triodes V and $V_1$ provide a feedback connection between the last mentioned bridge circuit and the input circuit of the triodes V and $V_1$ for opposing the input signal derived from the measuring slide wire contact B.

The physical construction of the circuit components of the device J of Fig. 2 is such that the heater resistor $ia$ is adapted to control the temperature of the temperature sensitive resistor $T_5$, while the heater resistor $ia'$ is adapted to control the temperature of the temperature sensitive resistor $T_6$. With no applied input signal to the triodes V and $V_1$, the two triodes are equally conductive, the energization of heater resistor $ia$ is substantially the same as that of the heater resistor $ia'$, and the bridge including resistors $T_5$ and $T_6$ is balanced. No feedback voltage is then generated across resistor $R_{16}$.

When a signal voltage is applied to the grids of the triodes V and $V_1$, the immediate effect is the production of an alternating output voltage signal across the resistor $R_{15}$ as explained above. As also explained above, the phase of this signal depends upon the phase of the signal voltage transmitted to the circuit J by the conductor $1a$.

Simultaneously with the production of the output voltage signal, one of the heater resistors $ia$ and $ia'$ is heated to an extent greater than the other, in consequence of which the bridge including the temperature sensitive resistors $T_5$ and $T_6$ gradually becomes unbalanced. Alternating voltage is then produced across resistor $R_{16}$, and that voltage is fed back to the grids of the triodes V and $V_1$ where it opposes, and substantially neutralizes, the applied signal transmitted to the triodes from the slider contact B. This feedback action makes the conductivity of the triode V substantially the same as that of triode $V_1$, and reduces the output voltage developed across the resistor $R_{15}$ substantially to zero.

With this arrangement, it is seen that upon a change in the instrument slide wire contact position, a voltage signal is temporarily produced across the output resistor $R_{15}$. The duration of that signal depends upon the heating actions of the heating resistors $ia$ and $ia'$ and their effects on the resistors $T_5$ and $T_6$.

Figure 3:
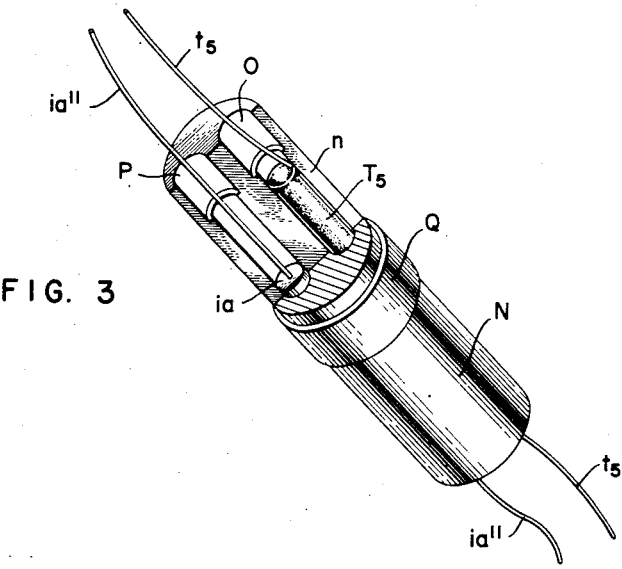
Fig. 3 is an elevation partly in section illustrating the construction of a thermal element shown diagrammatically in Fig. 2.

Advantageously, the resistors $ia$ and $T_5$ are associated to form a heating unit having a definite time constant or heating period, and the resistors $ia'$ and $T_6$ are combined to form a similar unit having the same time constant or heating period. One form which such a heating unit may take is illustrated in Fig. 3, wherein resistors $ia$ and $T_5$ are shown as being respectively housed in side-by-side channels P and O in a copper body N, with the terminals $ia''$ of the resistor $ia$ protruding from the opposite ends of the channel P and the terminals $t_5$ of the resistor $T_5$ protruding from the opposite ends of the channel O. As shown, the metallic body N is a copper cylinder which for convenience in assembly is divided to form two longitudinal half cylinders at opposite sides of a dividing plane $n$. As shown, the two halves of the member N are normally secured together by a ring-like member Q. With the resistors $T_5$ and $ia$ thus imbedded in the mass of heat conducting metal N, the time required for the temperature of the resistors $T_5$ and $i_a$ to reach an equilibrium value for a given current flow through the resistor $i_a$ depends upon the heat transfer rates between the resistors and the metal mass, upon the heat loss rate, and upon the heat storage capacity of said mass. In practice, the heating period required to reach temperature equilibrium is the time required to heat the metallic mass N to the temperature at which its heat loss rate is equal to the heat input rate. That period may well be of the order of one minute.

In the balanced condition of the apparatus shown in Fig. 1, with the slider contact B in its control point position, no voltage signal is transmitted through the conductor $1a$ to the rate circuit J. The currents flowing through the two circuit paths respectively including the upper and lower halves of the secondary winding $S_3$ may then be assumed to flow in opposite directions through the common portion of the two paths, which portion includes the resistor $R_{15}$. With that assumption, the voltage then developed across the resistor $R_{15}$ by current flow through the upper half of the winding $S_3$ may be that represented by the voltage curve sections 9, 10, 11, and 12 of Fig. 5, while the voltage simultaneously developed across the resistor $R_{15}$ by current flow through the lower half of the winding $S_3$ may be represented by the voltage curve sections 13, 14, 15, and 16 of Fig. 5.

Since the positive curve sections 9, 14, 11, and 16 are slightly smaller in amplitude than the corresponding negative curve sections 13, 10, 15, and 12, due to the small normal equal conductivity of the triodes V and $V_1$ during the half cycles in which their anodes are rendered positive, the resultant of these voltages produces across the resistor $R_{15}$ a small pulsating voltage having no supply voltage frequency components but only a double-frequency component and a direct current component. This resultant voltage is shown by the curve 17 of Fig. 8. As was mentioned hereinbefore, the double-frequency component has no significant effect on the operation of the amplifier F, and the direct current component is blocked from the amplifier F by the condenser 7'. Accordingly, for the purposes of the present invention, it can be said that no effective rate signal is produced by the circuit J when the contact B is in the control point position.

Fig. 4 illustrates the voltage conditions prevailing across the resistor $R_{15}$ when a voltage signal is being transmitted from the slider contact B to the input of the rate responsive circuit J through the conductor $1a$ having the phase required to increase the conductivity of the triode $V_1$ during the half cycles in which the anode potential of that triode is positive. Under the conditions assumed, the magnitudes of the voltages represented by the curve sections 9 and 11 of Fig. 4 are smaller than those represented by the corresponding curve sections of Fig. 5, and are smaller than those represented by the other curve sections of Fig. 4. Fig. 4 thus differs from Fig. 5 as the result of the reduction in the voltage developed across the resistor $R_{15}$ by the upper half of the winding $S_3$ due to increased conductivity of the triode $V_1$. The positive curve sections 14 and 16 are again somewhat smaller in amplitude than the corresponding sections 10 and 12, due to the normal, small conductivity of the triode V. The input signal which increases the conductivity of the triode $V_1$ has little appreciable effect on this normal conductivity of the triode V, due to the remote cut-off characteristic of the triode.

The resultant of the voltage components developed across the resistor $R_{15}$ under the conditions represented in Fig. 4 is illustrated in Fig. 7 by the curve 17'. The curve 17' differs from the curve 17 of Fig. 8 in that it comprises depressed portions 18 which indicate that the voltage resultant during the first and third half cycles of Fig. 4 is negative, as is apparent from a visual inspection of Fig. 4. The curve portions 18 of the curve 17' show that the resultant voltage represented by the curve 17' consists of an alternating current component of supply voltage frequency, a small double frequency component which can be disregarded as before, and a direct current component. The first mentioned alternating current component is the effective rate signal applied to the amplifier F, and can be seen to have a given phase, corresponding to that of the input signal which produced it.

Figs. 6 and 9 are curves analogous to Figs. 4 and 7, respectively, in that they illustrate the voltage conditions across the resistor $R_{15}$ prevailing during a period in which a voltage signal is being transmitted from the slider contact B to the input circuit of the rate response circuit J which is opposite in phase to the voltage signal giving rise to the voltage conditions illustrated by Figs. 4 and 7. In Fig. 6, the voltages represented by the curve sections 14 and 16 are smaller than the voltages represented by the other curve sections of Fig. 6. In consequence, the resultant voltage curve 17'', shown in Fig. 9, differs from the curve 17' of Fig. 7 in that its depressions 19 are in the second half cycle portions of the curve. This condition prevails when the conductivity of the triode V is increased during the half cycles in which its anode is rendered positive, and provides an alternating current component or rate signal of supply voltage frequency having a phase which is opposite to that of the corresponding component of Fig. 7 and which corresponds to that of the input signal producing it.

As will be apparent, the rate signal transmitted to the follow-up amplifier F from the resistor $R_{15}$ through the conductor 7 and condenser 7' as a result of an input signal impressed on the rate response circuit J through the conductor $1a$ will always be an alternating current signal of a phase corresponding to that of the last mentioned input signal. As noted above, the effect of the rate signal on the amplifier F is always in the same sense as that of the primary control signal which was responsible for the rate signal in the first place. Thus, at all times, the effect of the rate signal transmitted to the amplifier F from the rate response circuit J is to increase the extent of the follow-up adjustment of the slider contact D, and to increase the corresponding adjustment of the device L by the motor M through which the controlled variable is regulated.

As already indicated, the duration of the rate signal transmitted through the conductor 7 to the follow-up amplifier F is brief. Each such signal is initiated at the instant at which the adjustment of the slider contact B causes a signal to be transmitted by the conductor $1a$ of the circuit J. Each signal transmitted by the conductor 7 to the follow-up amplifier F is shortly terminated as a result of the feedback action of the resistor $R_{16}$. That action is delayed by the delay action of the heating units N and N' to give adequate time for the desired over-adjustment by the motor M of the slider contact D and the associated regulator L.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A rate circuit network having input circuit and first and second output circuit portions, conductor means connected to said input circuit and adapted to impress thereon a primary alternating voltage signal, amplifier means including said input circuit and said first output circuit for developing in the latter a temporary alternating voltage signal opposite in phase to said primary signal and of a magnitude dependent upon that of said primary signal, other means including said second output circuit and time delay means coupled between a portion of said first output circuit and said second output circuit, said time delay means being arranged to develop in said second output circuit a controlling alternating voltage signal opposite in phase to said primary signal and of a magnitude which increases from zero, following the impression of said primary signal on said input circuit, at a rate which is dependent upon the magnitude of said primary signal and upon the value of the time constant of said time delay means, whereby the magnitude of said controlling signal at a given time during the time period following the impression of said primary signal on said input circuit is dependent upon the magnitude of said primary signal and upon the value of said time constant, and a feedback connection between said second output circuit and said input circuit for feeding back to the latter said controlling signal for reducing said temporary signal and upon the value of said time constant toward zero during said time period and at a rate dependent upon the magnitude of said primary signal.

2. A rate circuit network as specified in claim 1, in which a heating resistor is included in said first output circuit and in which a temperature responsive resistor is included in said time delay means in position to be heated by said heating resistor and thereby regulate the duration of portion of said time period during which said temporary voltage signal is maintained.

3. A rate circuit as specified in claim 2, in which said resistors are associated with metallic heat absorbing material retarding the temperature increase of said temperature responsive resistor and thereby prolonging said time period portion during which said temporary voltage signal is maintained.

4. A rate circuit network as specified in claim 3, wherein said second output circuit includes a potentiometer resistor and a slider contact connected in said feedback connection, whereby the relative magnitudes of said primary and controlling signals may be regulated by adjustment of said contact along said potentiometer resistor.

5. In electrical control apparatus comprising a follow-up bridge circuit and a follow-up amplifier having an input circuit, and means for impressing on said input circuit an alternating control voltage signal which is the resultant of primary and follow-up alternating voltage signals developed in said follow-up circuit, said primary signal being proportional to the difference between the actual value of a controlled variable and a predetermined normal value thereof, and said follow-up signal being opposite in polarity to said primary signal, the improvement comprising a rate circuit network having input circuit and first and second output circuit portions, conductor means connected to said network input circuit and adapted to impress thereon said primary signal, amplifier means including said network input circuit and said first output circuit for developing in the latter a temporary alternating voltage signal opposite in phase to said primary signal and of a magnitude dependent upon that of said primary signal, other means including said second output circuit and time delay means coupled between a portion of said first output circuit and said second output circuit, said time delay means being arranged to develop in said second output circuit a controlling alternating voltage signal opposite in phase to said primary signal and of a magnitude which increases from zero, following the impression of said primary signal on said network input circuit, at a rate which is dependent upon the magnitude of said primary signal and upon the value of the time constant of said time delay means, whereby the magnitude of said controlling signal at a given time during the time period following the impression of said primary signal on said network input circuit is dependent upon the magnitude of said primary signal and upon the value of said time constant, a feedback connection between said second output circuit and said network input circuit for feeding back to the latter said controlling signal for reducing said temporary signal toward zero during said time period and at a rate dependent upon the magnitude of said primary signal and upon the value of said time constant, and a connection between said first output circuit and said follow-up amplifier input circuit for impressing on the latter said temporary signal.

6. A rate circuit network as specified in claim 1, in which said amplifier means comprises two triodes having their control grids directly connected together and also having their cathodes directly connected together, said control grids and cathodes being included in said input circuit and said primary signal being impressed between said connected control grids and said connected cathodes, in which said triodes are energized by alternating current supply means comprising a transformer having a primary winding and a secondary winding, the latter having one end terminal connected to the anode of one, and having its other end terminal connected to the anode of the second, of said triodes, and having a tap connection connected to said cathodes, in which a separate heating resistor is included in said connection between each of said anodes and the end of said secondary winding connected to that anode, in which said time delay means includes a separate temperature sensitive resistor thermally associated with each of said heating resistors, and in which each of said temperature sensitive resistors has one end terminal directly connected to the end of said secondary winding remote from the end of that winding to which one end of the corresponding one of said heating resistors is connected.

References Cited in the file of this patent

UNITED STATES PATENTS

| | | |
|---|---|---|
| 2,086,966 | Shrader | July 13, 1937 |
| 2,154,375 | Chambers | Apr. 11, 1939 |
| 2,269,249 | Bruck | Jan. 6, 1942 |
| 2,298,192 | Bollman | Oct. 6, 1942 |
| 2,322,264 | Turner | June 22, 1943 |
| 2,522,826 | Hooven | Sept. 19, 1950 |
| 2,524,886 | Colander | Oct. 10, 1950 |
| 2,553,060 | Miner | May 15, 1951 |
| 2,632,599 | Hornfeck | Mar. 24, 1953 |
| 2,694,169 | Ehret | Nov. 9, 1954 |